(12) United States Patent
Meyer

(10) Patent No.: US 7,297,067 B1
(45) Date of Patent: Nov. 20, 2007

(54) PLUG AND METHOD OF RETAINING THE SAME

(75) Inventor: Erik Harry Meyer, Chesterfield Township, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 238 days.

(21) Appl. No.: 11/007,607

(22) Filed: Dec. 8, 2004

(51) Int. Cl.
 *F16D 1/027* (2006.01)
(52) U.S. Cl. ....................... 464/182; 464/906
(58) Field of Classification Search .............. 464/15, 464/111, 144, 146, 170, 182, 906, 17; 403/10, 403/42; 228/112.1, 114.5; 138/89; 285/901
See application file for complete search history.

(56) References Cited

U.S. PATENT DOCUMENTS

| | | | | |
|---|---|---|---|---|
| 4,008,582 A | * | 2/1977 | Welschof | 464/146 |
| 4,150,553 A | * | 4/1979 | Aucktor | 464/906 |
| 4,242,888 A | * | 1/1981 | Komeiji et al. | 464/111 |
| 4,507,100 A | * | 3/1985 | Dore et al. | 464/111 |
| 7,097,563 B2 | * | 8/2006 | Benson et al. | 464/17 |
| 2003/0127908 A1 | * | 7/2003 | Lyon et al. | |
| 2004/0235606 A1 | * | 11/2004 | Brossard | |

FOREIGN PATENT DOCUMENTS

GB    2 086 534 A  *  5/1982

\* cited by examiner

*Primary Examiner*—Greg Binda
(74) *Attorney, Agent, or Firm*—Jennifer M Brumbaugh; Mick A. Nylander

(57) ABSTRACT

A shaft system for use in a vehicle is disclosed. The shaft system includes a tube. A constant velocity joint is secured to the tube. The shaft system also includes a plug arranged within the constant velocity joint wherein the plug is secured within the joint by a weld curl that is also used to secure the constant velocity joint to the tube.

11 Claims, 1 Drawing Sheet

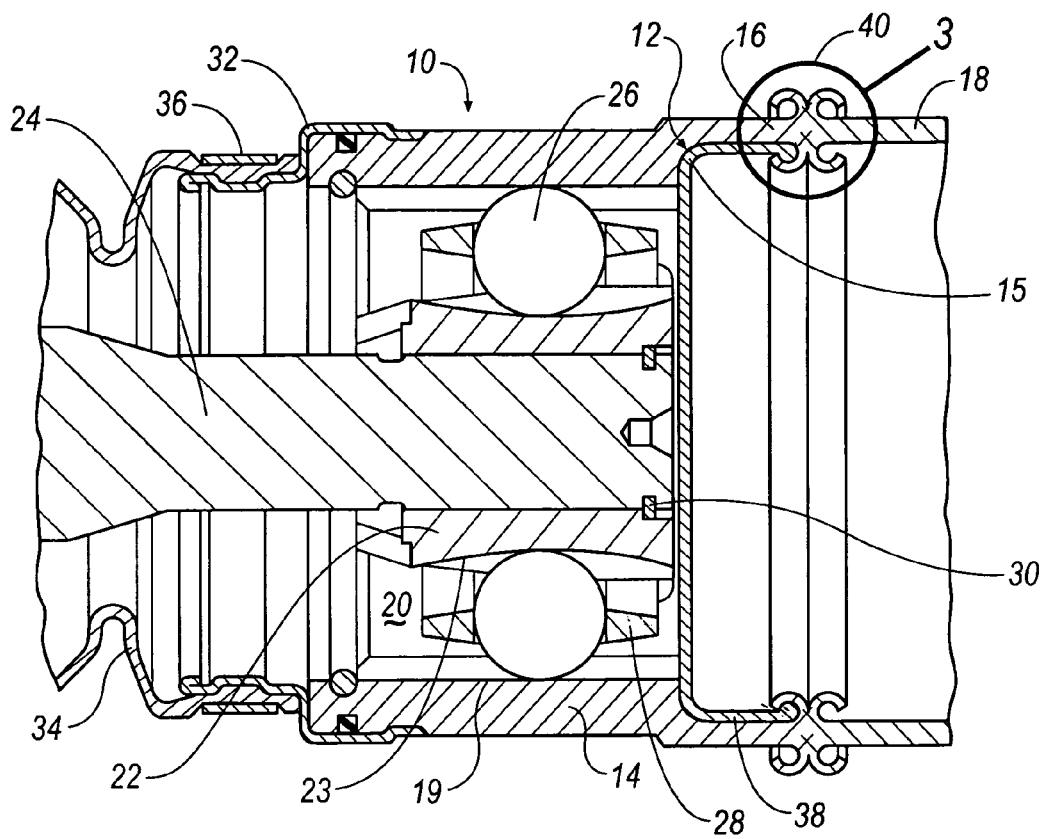
FIG. 1
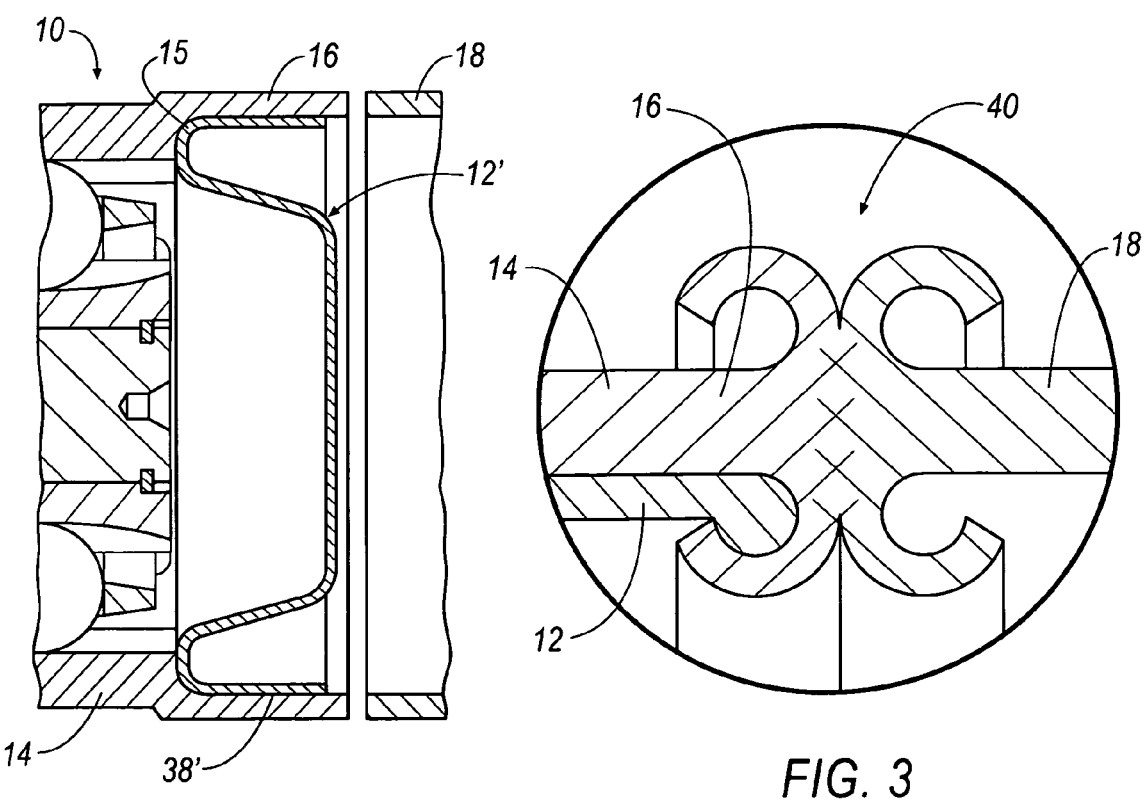
FIG. 2
FIG. 3

PLUG AND METHOD OF RETAINING THE SAME

FIELD OF THE INVENTION

The present invention generally relates to constant velocity joints and propeller shafts and more particularly to a method and apparatus for attaching a plug to a constant velocity joint to create a seal that is positively retained in the joint.

BACKGROUND

Constant velocity joints (CV joints) are common components in automotive vehicles. Typically constant velocity joints are used where transmission of rotating motion at a constant velocity is desired. The common types of constant velocity joints are a plunging tripod, a fixed tripod, a plunging ball joint and a fixed ball joint. These types of joints are currently used in front wheel drive vehicles, rear-wheel drive vehicles and on propeller shafts found in rear-wheel drive, all-wheel drive and four-wheel drive vehicles. The constant velocity joints are generally lubricated and sealed by a sealing boot. The constant velocity joints are sealed in order to retain grease inside the joint and keep contaminates, such as dirt and water, out of the joint. To achieve this protection a constant velocity joint is usually enclosed at the open end of the outer race by a sealing boot made of a rubber, thermoplastic or silicone type material. The opposite end of the outer race generally is enclosed by a dome or cap, commonly known as a grease cap. A monoblock or integral stem and race design style joint is sealed by the internal geometry of the outer race. This sealing and protection of the constant velocity joint prevents contamination of the inner chamber of the constant velocity joint that may cause internal damage to the joint.

A main function of a constant velocity joint is the transmission of rotational torque at a constant velocity. Traditional constant velocity joint assemblies include a variety of bolted joint designs to assemble the joint to a propeller shaft or half shaft within an automotive vehicle. Other assemblies are welded or use other chemical or mechanical bonding methods to secure a constant velocity joint to a tube or other propeller shaft component.

Many of these traditional constant velocity joints use a plug that is pressed into place within the constant velocity joint outer race or tube. These traditional plugs are capable of being dislodged allowing disassembly and loss of sealing function of the constant velocity joint under certain predefined parameters. Furthermore, the integrity of sealing components and retaining rings used to create positive stops for varying types of CV joints, including fixed joints, plunging joints, or crashworthy joints, and to seal contaminates from entering the internal chamber of a constant velocity joint may decay with time and the harsh environments found in constant velocity joints. Therefore, costly repairs may be necessary to replace seals and/or to repair seals in the constant velocity joint environment. Furthermore, many of the plunging constant velocity joints typically have a monoblock design, which requires a heavier constant velocity joint thus increasing weight for the automotive manufacturing and requisite gas mileage for the vehicles.

Therefore, there is a need in the art for a constant velocity joint that has a plug installed into an outer race, tube or other component that will be used as a seal and as a positive stop for any known type of constant velocity joint. There also is a need in the art for a lighter weight constant velocity joint that is easier to manufacture and more cost effective than traditional constant velocity joints.

SUMMARY OF THE INVENTION

A shaft system for use in a vehicle wherein the system includes a tube and a constant velocity joint secured to the tube. The system also includes a plug arranged within the constant velocity joint. The plug is secured within the constant velocity joint by a weld curl that is also used to secure the constant velocity joint to the tube.

Many features of the present invention will become apparent from the subsequent description and appended claims, taken in conjunction with the accompanying drawings.

BRIEF DESCRIPTION OF THE DRAWINGS

FIG. 1 shows a cross-sectional view of a constant velocity joint having a welded plug according to the present invention.

FIG. 2 shows a partial cross-sectional view of a portion of a constant velocity joint prior to the welding operation.

FIG. 3 shows a cross-sectional view of the weld area of the present invention of FIG. 1.

DETAILED DESCRIPTION

Referring to the drawings, a constant velocity joint 10 according to the present invention is shown. As illustrated, the constant velocity joint 10 is shown as a plunging ball joint, however, it should be noted that all types of joints such as, but not limited to, plunging tripods, fixed tripods, plunging ball joints, fixed ball joints, and the like, may be used with the present invention. Furthermore, any type of tube or other component to be sealed may also be used with the present invention.

FIG. 1 shows an embodiment of the current invention. The constant velocity joint 10 is a plunging constant velocity ball joint that is generally used in a propeller shaft or half shaft of an all-wheel drive or four-wheel drive vehicle. The constant velocity joint 10 includes an outer race 14. The outer race 14 has a lip 16 extending from one end thereof. Secured to the outer race 14 and/or lip 16 is a tube 18 or other component of a propeller shaft, half shaft or driveshaft of an automotive driveline system. An inner wall 19 of the outer race 14 generally defines a constant velocity joint chamber 20. An inner race 22 is located and arranged within the outer race 14. The inner race 22 is connected to a shaft 24, of the driveline system. A plurality of rolling elements or balls 26 are located between an outer surface 23 of the inner race 22 and the inner surface 19 of the outer race 14. The balls or rolling elements 26 are held in position between the outer race 14 and the inner race 22 by a cage 28. The rotation of the outer race 14 rotates the inner race 22 at the same or constant speed thus allowing for rotational motion or torque to be transmitted at a constant velocity through the joint 10 between the tube 18 and the shaft 24. The tube 18 and shaft 24 are positioned relative to each other at an angle up to a predetermined maximum angle. The constant velocity joint 10 allows the angle to change because the balls 26 rotate and compensate for any differences in the angle between the shaft 24 and the tube 18 by moving within tracks of the outer race 14 and inner race 22. A ring retainer 30 or any other known fastener is arranged between the shaft 24 and the inner race 22 to connect the shaft 24 to the inner race 22. The present invention also contemplates other types of connections between the shaft 24 and the inner race 22.

A boot cover 32 is connected to an end of the outer race 14. One end of the boot cover 32 has a boot member 34 engaged with it, which in an embodiment is made of a urethane. However, it should be noted that any other type of hard or soft plastic, rubber, composite, fabric and like material might also be used for the boot member 34. The boot member 34 is secured to the boot cover 32 by any known fastener 36 using any type or known fastening technique. The opposite end of the boot member 34 engages the shaft 24 to create a seal on one end of the constant velocity joint 10 for the joint chamber 20. The boot member 34 seals the one end of the constant velocity joint 10 from any outside contaminants, such as water, dirt, and road grime. The suppleness of the boot member 34 allows for the seal to be maintained at any angle of inclination and also for any axial plunge of the shaft 24 that may occur during normal roadway and off-road driving operations.

The constant velocity joint 10 includes a plug 12 that is arranged within a circumferential shoulder portion 15 of the outer race 14. The shoulder portion 15 is defined by the intersection of the outer race 14 and the lip 16 of the outer race 14. The plug 12 is in contact with the lip 16 of the outer race 14 and the shoulder portion 15 of the outer race 14. Plug 12 may be made of a metal material. Any known shape for the plug 12 may be used. In the embodiment shown, the plug 12 generally has a disc-like shape with a circumferential flange 38 extending from an end thereof. The plug 12 generally has a U-shaped cross-section, as illustrated in FIG. 1. It should be noted that any other shape of plug 12 might also be used for the present invention, as illustrated in FIG. 2. Further, as illustrated, the material thickness of the plug 12 is generally uniform. However, the material thickness may be varied in order to control the resulting performance of the plug 12 during a crash. The plug 12 is arranged within the outer race 14 such that the plug 12 engages the shoulder portion 15 of the outer race 14. The plug 12 extends along the lip 16 of the outer race 14. The plug 12 may be the same length as the outer race lip 16, shorter than the outer race lip 16 or extend beyond the outer race lip 16 depending on the design requirements for the connecting methodology to be used.

Tube 18 is aligned with and connected to the outer race 14 via any known mechanical or chemical bonding technique. In one embodiment, welding is used to secure the tube 18 to the outer race 14. Specifically, a typical friction weld operation is performed to secure the tube 18 to the outer race 14. The friction weld operation creates a weld curl 40 to secure both the tube 18 and plug 12 to the outer race 14. The weld curl 40 allows the plug 12 to be retained within the outer race 14 and to create a seal for the constant velocity joint 10 on one end. During the welding operation, in the present example, a friction welding operation, the outer race lip 16, an end of tube 18, and the plug 12 interact and fuse with each other from the heat of the friction welding operation to create a secure connection between the tube 18 and the outer race 14 and also between the outer race 14 and the plug 12. The present invention creates a positive mechanical stop for the plug 12 by securing the plug 12 to the outer race 14 at a predetermined position with a predetermined force. The plug 12 acts as a mechanical stop for the plunging joint up to a predetermined axial force.

The welding operation, in the form of a weld curl 40, also creates a positive seal without the use of additional gaskets, O rings, or sealants at one end of the constant velocity joint 10. The present invention provides a positive seal that confines lubricant, specifically a grease or the like, within the constant velocity joint chamber 20 without any leakage to the outer environment. As shown in FIG. 3 the weld curl 40 curls the outer race lip 16 around an end of the plug 12 thus creating a permanent and positive seal and permanent and positive mechanical stop for the constant velocity joint 10. The use of the weld curl 40 allows for increased loads on the plug 12 before the plug 12 becomes dislodged from its position. Thus, plug retention is greater and the sealing effect of the constant velocity joint 10 is increased thus increasing overall durability of the constant velocity joint 10.

It should be noted that the present invention can be used for any cylindrical member or tube needed to be sealed or positively capped. In the present invention the seal is used on the open end of a plunging constant velocity joint 10. Generally, plunging joints are of a monoblock design, which have a closed geometry on one end thereof. The open joint design as shown in the present invention reduces the weight of the constant velocity joint. Further, the open joint design allows for broaching of tracks, which allows for greater dimensional contact throughout the constant velocity joint. Accordingly, there is a reduction of NVH and balancing concerns for the constant velocity joint 10 of the present invention. The weld curl 40 of the present invention creates a positive mechanical stop to prevent disassembly of the joint. The plug 12 of the present invention needs greater forces than traditionally attached plugs to dislodge thus making disassembly and loss of sealing function less likely with the present invention as compared to plugs that are simply pressed into the outer race and not secured via any known positive bond. Furthermore, the weld curl 40 retained plug 12 of the present invention creates a sealing barrier to prevent egress of grease, air or other liquids or lubricants and the like from the joint chamber 20 of the constant velocity joint 10. Furthermore, plug 12 provides a barrier for entry of contaminants into the joint chamber 20 of the constant velocity joint 10. The present invention also reduces the number of parts necessary for a constant velocity joint 10 by removing the need for a separate retaining ring or other fastener to attach a traditional plug to the outer race 14.

A method of assembling a constant velocity joint 10 according to the present invention may be used as follows or in any other acceptable manner. The constant velocity joint 10 is assembled according to any well-known assembly method that will install all necessary components of the constant velocity joint within one another. Also, a plug 12 of any known shape is aligned and inserted into one end of the outer race 14 such that the plug 12 is seated on a shoulder portion 15 or other known portion of the outer race 14. The plug 12 has a circumferential flange 38 that aligns with the end of the outer race lip 16, aligns shorter than the end of the outer race lip 16, or extends beyond the outer race lip 16 depending on the design requirements of the constant velocity joint 10. Next, a tube 18 or other component is aligned and centered with respect to the outer circumference of the outer race 14 and in particular the outer race lip 16. Then the assembly has any known connecting technique performed between the outer race 14 and the tube 18. In one embodiment, the connecting method is a friction welding operation that results in a friction weld curl 40 between the tube 18, the outer race lip 16, and the end of the plug 12. This welding operation creates a weld curl 40 that secures the tube 18 to the outer race 14 for transfer of rotational motion at a constant velocity through the constant velocity joint 10 and the shaft 24. Further, the welding operation also creates a secure connection between the outer race 14 and the plug 12 thus creating a positive mechanical stop and a positive seal for the constant velocity joint 10 and the constant velocity joint chamber 20 on one end thereof. The weld 40 creates an interaction and fusion between the materials of the plug 12 and outer race 14 and outer race 14 and tube 18. For example, an end of plug 12 may curl after a welding operation, interacting and fusing with outer race 14. It should be noted that the plug 12, outer race 14, and tube 18, all have the necessary preparation of their respective surfaces prior to the welding operation in order to create a proper welding and connecting environment. Furthermore, a proper cool down methodology and post welding technique is also contemplated to create a weld that is strong and performs at the high speeds and high torques found in constant velocity joint environments. It should be noted that any other known connecting method other than friction welding might also be used to connect the tube 18 to the outer race 14 and the outer race 14 to the plug 12.

FIG. 2 shows an embodiment of the present invention using an alternate plug 12'. The alternate plug 12' has a generally W-shaped design, including circumferential flange 38', as compared to the U-shaped design of plug 12 of FIG. 1. FIG. 2 also shows the invention prior to the performance of the connecting or welding operation.

The present invention has been described in an illustrative manner. It is to be understood that the terminology that has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A shaft system for use in a vehicle, said system including:
   a hollow tube;
   a constant velocity joint secured to said tube; and
   a plug arranged within said constant velocity joint, said plug secured within said constant velocity joint by a weld curl, said weld curl used to secure said constant velocity joint to said tube.

2. The system of claim 1 wherein said weld curl is provided by a friction welding operation.

3. The system of claim 1 wherein said constant velocity joint including:
   an outer race;
   an inner race arranged within said outer race; and
   a plurality of rolling elements arranged between said outer race and said inner race.

4. The system of claim 3 wherein said outer race having a lip extending from one end, said outer race having a shoulder, said plug in contact with said lip and said shoulder.

5. The system of claim 4 wherein said plug in part defines said weld curl.

6. The system of claim 1 wherein said plug forms a seal for said constant velocity joint.

7. The system of claim 6 wherein said seal is a permanent and positive seal.

8. The system of claim 1 wherein said plug is a positive mechanical stop which prevents disassembly of said constant velocity joint.

9. The system of claim 5 wherein an end of said plug curls after a welding operation and interacts and fuses with said outer race.

10. The system of claim 1 wherein said plug is made of a metal material.

11. The system of claim 1 wherein said plug has a generally uniform material thickness.

* * * * *